under 35

(12) United States Patent
Lawrence et al.

(10) Patent No.: US 10,955,074 B2
(45) Date of Patent: Mar. 23, 2021

(54) THREADED PIPE CONNECTIONS AND SOCKETS FOR MAKING THE SAME IN SITU

(71) Applicant: NIBCO INC., Elkhart, IN (US)

(72) Inventors: Benjamin L. Lawrence, Elkhart, IN (US); Richard D. Latham, Granger, IN (US); David A. Bobo, Granger, IN (US); Christopher W. Mason, Granger, IN (US); Ronald Dale Paige, Granger, IN (US)

(73) Assignee: NIBCO Inc., Elkhart, IN (US)

( * ) Notice: Subject to any disclaimer, the term of this patent is extended or adjusted under 35 U.S.C. 154(b) by 352 days.

(21) Appl. No.: 15/961,135

(22) Filed: Apr. 24, 2018

(65) Prior Publication Data

US 2018/0313476 A1    Nov. 1, 2018

Related U.S. Application Data

(60) Provisional application No. 62/491,848, filed on Apr. 28, 2017, provisional application No. 62/526,444, filed on Jun. 29, 2017.

(51) Int. Cl.
*F16L 15/08* (2006.01)
*F16L 15/00* (2006.01)
*B23G 5/04* (2006.01)

(52) U.S. Cl.
CPC ............ *F16L 15/006* (2013.01); *B23G 5/043* (2013.01); *F16L 15/008* (2013.01); *F16L 15/08* (2013.01)

(58) Field of Classification Search
CPC .................................. F16L 15/08; F16L 15/008

USPC ........................................................ 285/391
See application file for complete search history.

(56) References Cited

U.S. PATENT DOCUMENTS

| | | | | | |
|---|---|---|---|---|---|
| 1,008,551 | A | * | 11/1911 | Lorenz | F16L 37/2445 285/391 |
| 1,130,497 | A | * | 3/1915 | Dunham | A45D 40/00 285/391 |
| 1,588,606 | A | * | 6/1926 | Oden | B21D 39/046 285/391 |
| 1,781,199 | A | * | 11/1930 | Sixma | H02G 3/0616 285/323 |
| 1,793,113 | A | * | 2/1931 | Metcalf, Jr. | H02G 3/0616 285/391 |
| 2,115,743 | A | * | 5/1938 | Niblett | F41A 3/30 285/391 |

(Continued)

FOREIGN PATENT DOCUMENTS

DE     102005043238 A1    3/2007

*Primary Examiner* — David Bochna
(74) *Attorney, Agent, or Firm* — Price Heneveld LLP (57) ABSTRACT

A pipe socket for making a threaded pipe connection that includes: a socket body defining a threaded portion, a cavity and a stop; an O-ring positioned within the cavity; and a plurality of interrupted series of tapping threads defined on an internal surface of the socket body in the threaded portion. The cavity is configured to receive a pipe and the stop is configured to stop a pipe received within the cavity. Each of the interrupted series of tapping threads is circumferentially equidistant from the adjacent interrupted series of tapping threads. Further, each of the interrupted series of tapping threads comprises threads arranged axially on the internal surface of the socket body for forming threads on a pipe received within the cavity.

16 Claims, 9 Drawing Sheets

(56) References Cited

U.S. PATENT DOCUMENTS

| | | | | |
|---|---|---|---|---|
| 2,152,962 A | * | 4/1939 | Ice | F16L 15/001 |
| | | | | 285/391 |
| 2,580,818 A | * | 1/1952 | Mundy | F16L 41/14 |
| | | | | 285/40 |
| 2,889,156 A | * | 6/1959 | Dearing | B65D 39/084 |
| | | | | 285/391 |
| 3,131,952 A | * | 5/1964 | D Esopo | H02G 3/06 |
| | | | | 285/391 |
| 3,477,750 A | | 11/1969 | Powell | |
| 3,600,008 A | * | 8/1971 | Barry | F16L 5/00 |
| | | | | 285/391 |
| 4,054,305 A | * | 10/1977 | Gajajiva | F16L 15/08 |
| | | | | 285/39 |
| 4,159,134 A | * | 6/1979 | Shemtov | F16L 19/08 |
| | | | | 285/391 |
| 4,256,421 A | * | 3/1981 | Kloster | F16B 37/005 |
| | | | | 408/205 |
| 4,479,667 A | * | 10/1984 | Major | F16L 41/14 |
| | | | | 285/391 |
| 5,080,406 A | | 1/1992 | Hyatt et al. | |
| 6,216,723 B1 | * | 4/2001 | King | F16L 47/34 |
| | | | | 137/318 |
| 7,954,861 B2 | | 6/2011 | Swift et al. | |
| 10,145,405 B1 | * | 12/2018 | Strom | B23P 6/00 |
| 2014/0197633 A1 | | 7/2014 | Nixon et al. | |

* cited by examiner

THREADED PIPE CONNECTIONS AND SOCKETS FOR MAKING THE SAME IN SITU

CROSS-REFERENCE TO RELATED APPLICATIONS

This patent application claims priority under 35 U.S.C. § 119(e) to U.S. Provisional Patent Application No. 62/491,848, entitled "INSITU SELF TAPPING/THREADING PIPE CONNECTION COMPONENT," filed Apr. 28, 2017, and U.S. Provisional Patent Application No. 62/526,444, entitled "THREADED PIPE CONNECTIONS AND SOCKETS FOR MAKING THE SAME IN SITU," filed Jun. 29, 2017, the entire disclosures of which are incorporated herein by reference.

FIELD

The present disclosure generally relates to the on-site mechanical joinery of piping components, including valves, adapters, couplings, flanges, caps, assemblies and other fittings, particularly threaded pipe connections and sockets for making the same in situ for black iron piping systems intended for gas service.

BACKGROUND

Modern piping includes a diverse range of joinery techniques and products, including traditional approaches to plumbing, such as thread connection and thermal bonding (i.e., soldering and brazing), as well as evolving mechanical means of joining (i.e., push-and-press). These many means of pipe joinery have certain inherent advantages and disadvantages that largely dictate their use.

Threading, perhaps the most common means of joinery, finds favor in the inherent simplicity and high certainty of achieving a sound and secure connection. The downside of threading can be recognized in the need to either cut or form mating threads that will lock together the connection member to the pipe. Typically, threading is conducted off-site during the manufacture of piping or on-site by specialized tapping equipment. In either case, threading-related activities can significantly increase the cost and time of piping joinery procedures and installations.

When done properly, thermal bonding, including soldering and brazing, results in an excellent joint with good durability. Thermal joinery, arguably an art that involves significant training and experience, requires a controlled application of thermal energy by an open flame torch, induction equipment or other heat sources. Further, thermal joinery also requires consumable materials (i.e., flux and filler) and calls for pipe and component preparatory work prior to making the joint. As such, thermal bonding processes can also add significant cost, time and safety considerations to piping joinery procedures and installations.

Accordingly, there is a need for piping joinery methods and configurations that are lower cost, faster and safer than conventional piping joinery methods and configurations, including conventional threading and thermal bonding approaches.

SUMMARY OF THE DISCLOSURE

According to an aspect of the disclosure, a pipe socket for making a threaded pipe connection is provided that includes: a socket body defining a threaded portion, a cavity and a stop; an O-ring positioned within the cavity; and a plurality of interrupted series of tapping threads defined on an internal surface of the socket body in the threaded portion. The cavity is configured to receive a pipe and the stop is configured to stop a pipe received within the cavity. Each of the interrupted series of tapping threads is circumferentially equidistant from the adjacent interrupted series of tapping threads. Further, each of the interrupted series of tapping threads comprises threads arranged axially on the internal surface of the socket body for forming threads on a pipe received within the cavity.

According to another aspect of the disclosure, a pipe socket for making a threaded pipe connection is provided that includes: a socket body defining a threaded portion, a cavity and a stop; and a plurality of O-rings positioned within the cavity; and a plurality of interrupted series of tapping threads defined on an internal surface of the socket body in the threaded portion. The cavity is configured to receive a pipe, and the stop is configured to stop a pipe received within the cavity. Each of the interrupted series of tapping threads is circumferentially equidistant from the adjacent interrupted series of tapping threads. Further, each of the interrupted series of tapping threads comprises threads arranged axially on the internal surface of the socket body for forming threads on a pipe received within the cavity.

According to a further aspect of the disclosure, a threaded pipe connection is provided that includes: a socket body defining a threaded portion, a cavity and a stop; an O-ring positioned within the cavity; a plurality of interrupted series of tapping threads defined on an internal surface of the socket body in the threaded portion; and a pipe received within the cavity that comprises an end in contact with or proximate to the stop. Each of the interrupted series of tapping threads is circumferentially equidistant from the adjacent interrupted series of tapping threads. Further, each of the interrupted series of tapping threads comprises threads arranged axially on the internal surface of the socket body for forming threads on a pipe received within the cavity.

These and other aspects, objects, and features of the present disclosure will be understood and appreciated by those skilled in the art upon studying the following specification, claims, and appended drawings.

BRIEF DESCRIPTION OF THE DRAWINGS

The following is a description of the figures in the accompanying drawings. The figures are not necessarily to scale, and certain features and certain views of the figures may be shown exaggerated in scale or in schematic in the interest of clarity and conciseness.

In the drawings.

DETAILED DESCRIPTION

Additional features and advantages of the invention will be set forth in the detailed description which follows and will be apparent to those skilled in the art from the description, or recognized by practicing the invention as described in the following description, together with the claims and appended drawings.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions.

For purposes of this disclosure, the term "coupled" (in all of its forms: couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature, or may be removable or releasable in nature, unless otherwise stated.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about" the numerical value or end-point of a range is intended to include two embodiments: one modified by "about," and one not modified by "about." It will be further understood that the endpoints of each of the ranges are significant both in relation to the other endpoint and independently of the other endpoint.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

Referring to FIGS. 1-5B, the depicted pipe socket configurations (e.g., pipe sockets 10-10c) allow a field technician (e.g., a plumber, home owner, handy-person, etc.) to easily and quickly secure threaded pipe connections (e.g., threaded pipe connections 100-100c) in situ through only the use of design features of the pipe socket, along with a traditional torqueing tool (e.g., a fixed wrench, a socket, adjustable crescent wrench, etc.), eliminating the need for significant pipe preparation, open flame joinery, adhesives, and/or other mechanical joinery tools. The ultimate goal is to provide a pipe socket configuration for making threaded pipe connections in situ in a manner that is safer, less costly, and less time consuming as compared to conventional pipe joinery configurations and techniques.

Figure 1:
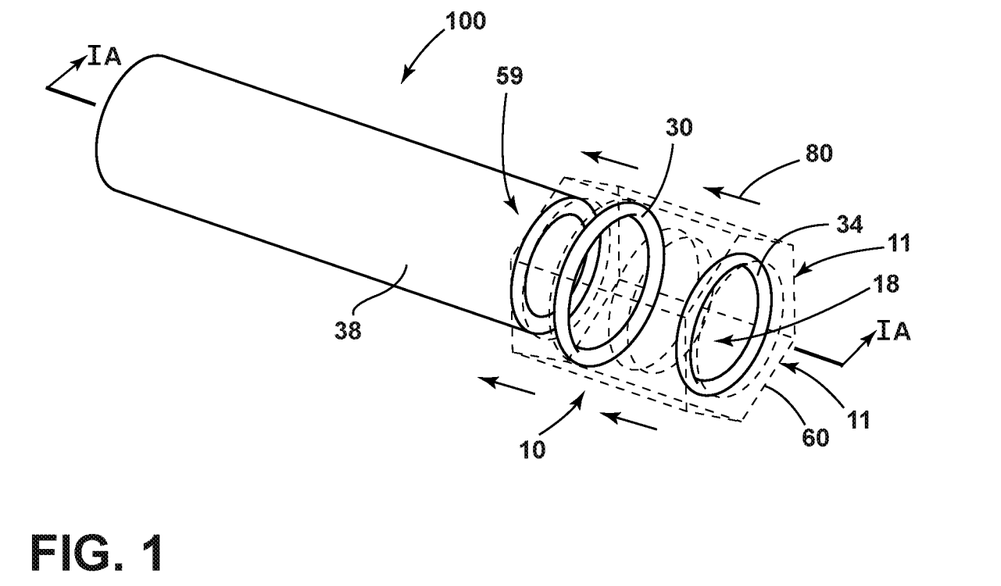
FIG. 1 is a perspective, cut-away view of a pipe socket with dual O-rings and a pipe for making a threaded pipe connection in situ, according to an embodiment.
Figure 1A:
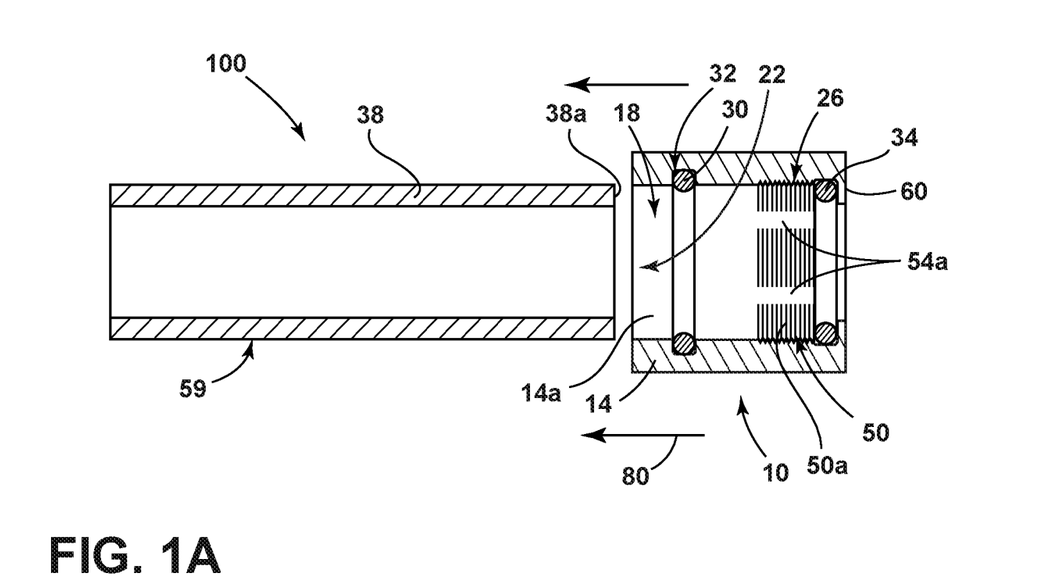
FIG. 1A is a cross-sectional view of the pipe socket and pipe depicted in FIG. 1 along line IA-IA.
Figure 1B:
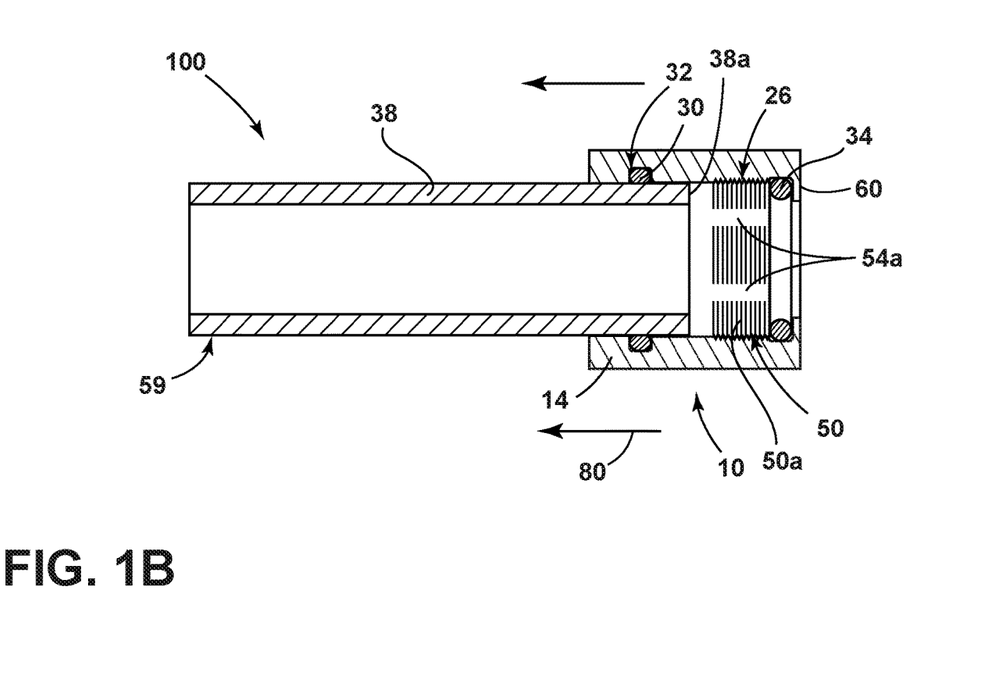
FIG. 1B is a cross-sectional view of the pipe socket and pipe depicted in FIG. 1, as the pipe is received in a cavity of the socket.
Figure 1C:
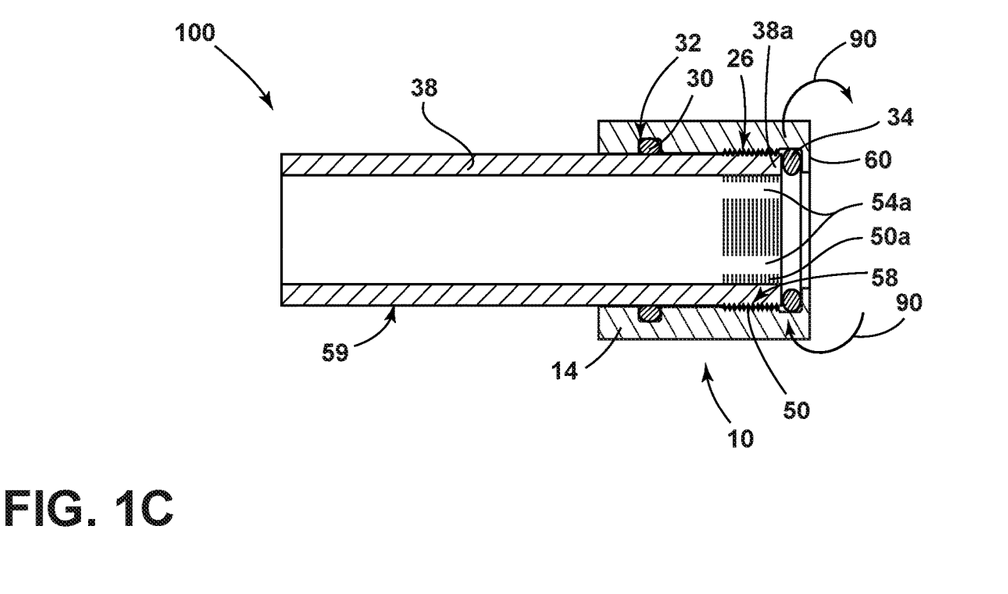
FIG. 1C is a cross-sectional view of a threaded pipe connection formed in situ by the pipe socket and pipe depicted in FIG. 1, according to an embodiment.

Referring now to FIGS. 1-1C, reference numerals 10 and 100 are generally directed to a pipe socket and a threaded pipe connection, respectively. The pipe socket 10 includes a socket body 14 defining a cavity 18, or connection bore, therein. The socket body 14 also defines an opening 22 at one end of the cavity 18 and a threaded portion 26 at an opposite end. Further, the socket body 14 also includes a stop 60. The cavity 18 is configured to accept the insertion of a pipe 38, and the stop 60 is configured to stop a pipe 38 received within the cavity 18. In some embodiments, the cavity 18 is configured in a cylindrical shape to receive the pipe 38, and particularly the end 38a of the pipe. The stop 60, in some embodiments, is configured with a smaller diameter than the diameter of the cavity 18 to ensure that the end 38a of the pipe 38 is prevented from further movement through the cavity 18 upon reaching the stop 60.

Figure 4:
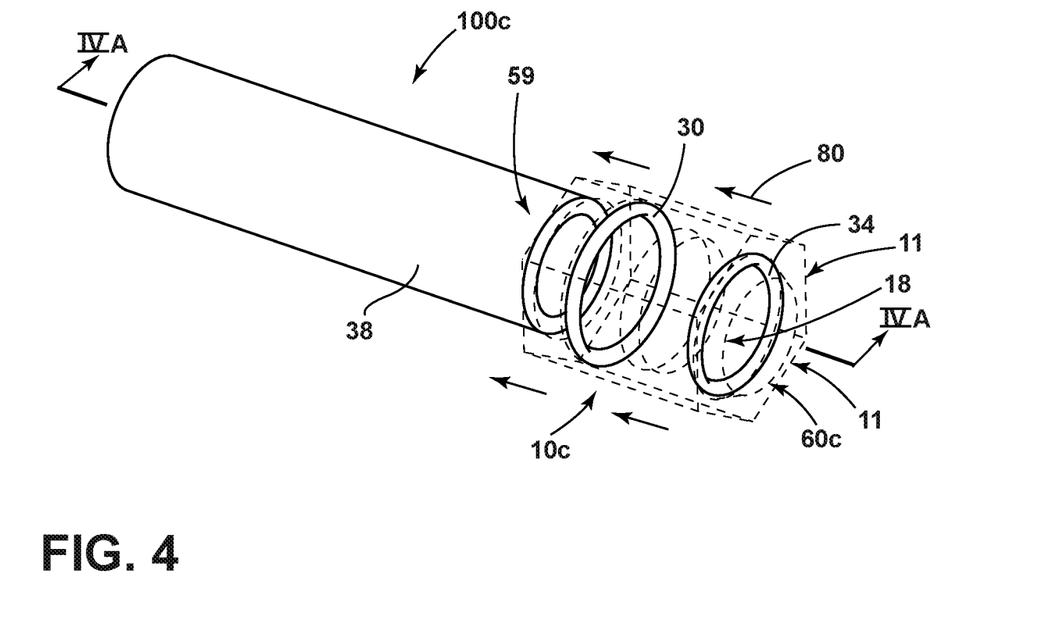
FIG. 4 is a perspective, cut-away view of a pipe and a pipe socket with dual O-rings and a tapered stop for making a threaded pipe connection in situ, according to an embodiment.
Figure 4A:
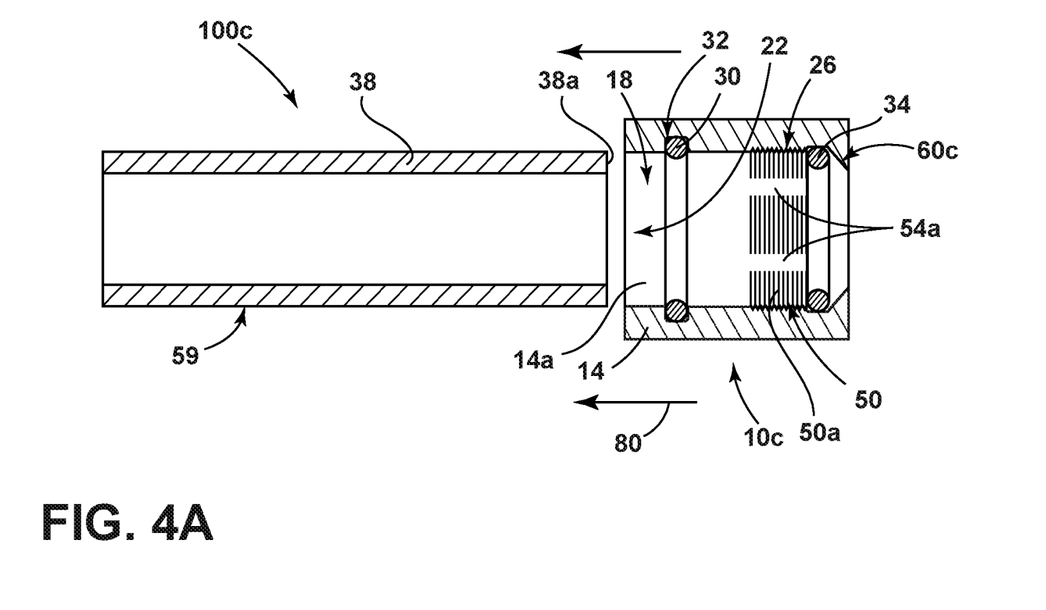
FIG. 4A is a cross-sectional view of the pipe socket and pipe depicted in FIG. 4 along line IVA-IVA.
Figure 4B:
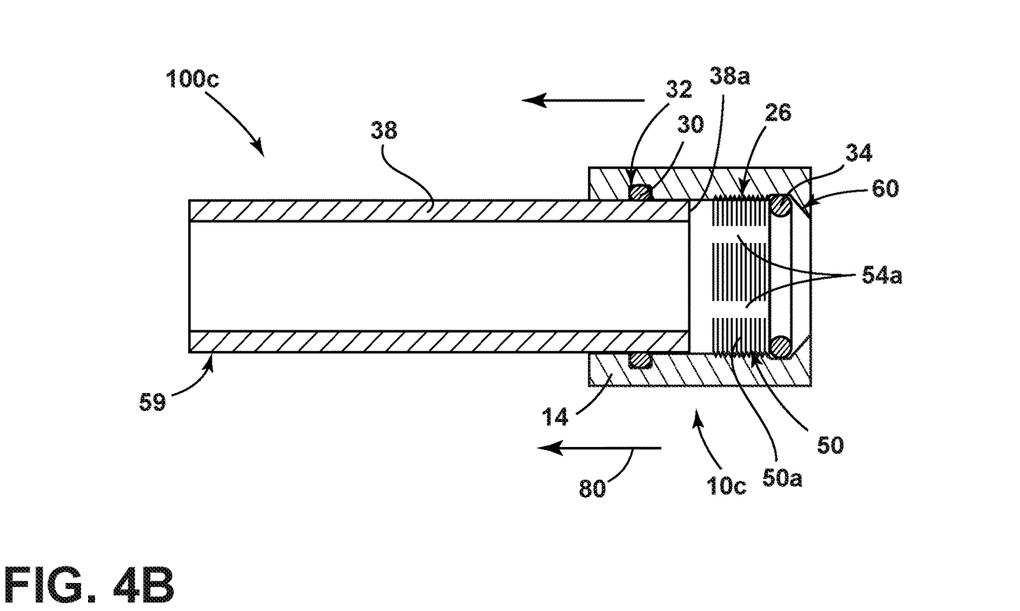
FIG. 4B is a cross-sectional view of the pipe socket and pipe depicted in FIG. 4, as the pipe is received in a cavity of the socket.
Figure 4C:
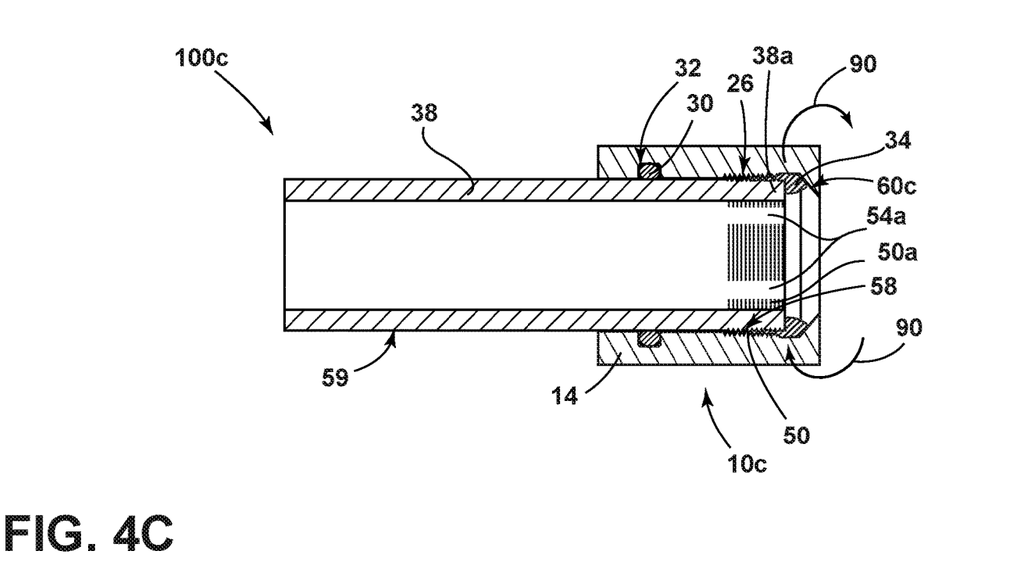
FIG. 4C is a cross-sectional view of a threaded pipe connection formed in situ by the pipe socket and pipe depicted in FIG. 4, according to an embodiment.

As also depicted in FIGS. 1-1C, the pipe socket 10 includes a first O-ring 30 positioned proximate the opening 22 within the cavity 18 of the socket body 14 and a second O-ring 34 positioned proximate the threaded portion 26 of the socket body 14. Each of the first and second O-rings 30, 34 can be fabricated from a low modulus material, such as a polymer or other elastomeric material (e.g., nylon, ABS, a rubber, etc.), to function as a seal upon compression with aspects of the pipe socket 10 and the pipe 38. In some embodiments, the first O-ring 30 is positioned in a recess 32 within the internal surface 14a of the socket body 14 proximate to the threaded portion 26 such that an outer surface 59 of the pipe 38 received within the cavity 18 compresses the O-ring 30 upon insertion of the pipe 38 into the cavity 18. According to some implementations, the second O-ring 34 is positioned adjacent to the stop 60 such that an end 38a of the pipe 38 received within the cavity 18 compresses the O-ring 34 against the stop 60. Further, in some embodiments, the stop 60 can be shaped, e.g., tapered (see, e.g., a stop 60c with a tapered profile as depicted in FIGS. 4-4C), faceted, etc. (not shown), such that an end 38a of the pipe 38 received within the cavity 18 compresses the O-ring 34 against the stop 60 and displaces a portion of the O-ring 34 such that it is in contact with an outer surface 59 of the pipe 38.

As further depicted in FIGS. 1-1C, the socket 10 includes a plurality of interrupted series 50 of tapping threads 50a on an internal surface 14a of the socket body 14 in the threaded portion 26. Each of the interrupted series 50 of tapping threads 50a is circumferentially equidistant from the adjacent series 50 of tapping threads 50a. Between the interrupted tapping threads 50a are a plurality of openings 54a. Consequently, the number of openings 54a is dependent upon the number of interrupted series 50 of tapping threads 50a. In addition, each of the interrupted series 50 of tapping threads 50a comprises threads arranged axially on the internal surface 14a of the socket body 14, configured for forming threads (e.g., pipe threads 58) on a pipe 38 received within the cavity 18 as the socket body 14 is rotated relative to the pipe 38. According to some embodiments, the interrupted series 50 of tapping threads 50a can range from four (4) to fifty (50) series 50 of tapping threads 50a, depending on the dimensions of the socket body 14 and cavity 18. In a preferred embodiment, the series 50 of tapping threads 50a ranges from four (4) to twelve (12) interrupted series.

Referring again to the plurality of interrupted series 50 of tapping threads 50a and the plurality of openings 54a (see FIGS. 1-1C), the tapping threads 50a can form pipe threads 58 (see FIG. 1C) in the pipe end 38a as the socket body 14 is rotated relative to the pipe end 38a. Advantageously, the presence of the openings 54a between the interrupted series 50 of tapping threads 50a allows material from the pipe end 38a to exit the socket body 14 as the pipe threads 58 are formed by the tapping threads 50a. As such material exits the socket body 14 during the formation of the pipe threads 58 in the pipe end 38a, the force necessary to continue to rotate the socket body 14 relative to the pipe end 38a is relatively low, thus ensuring that a significant extent of pipe threads 58 are formed in the axial direction within the pipe end 38a. As a result, the openings 54a in the pipe socket 10, in combination with the tapping threads 50a, facilitate the formation of a strong bond or seal between the pipe end 38a and the socket 10 in a threaded pipe connection 100.

In embodiments, the pipe socket 10 (see FIGS. 1-1C) is configured to advance over, and be mechanically secured to, the pipe 38. Accordingly, the pipe socket 10 and the pipe 38 are configured to seal to one another, thus forming a threaded pipe connection 100 (see FIG. 1C). More particularly, the first and second O-rings 30, 34 of the pipe socket 10 depicted in FIGS. 1-1C act to seal the pipe 38, particularly the pipe end 38a, within the socket body 14. In this embodiment, the first O-ring 30 can form a seal upon compression as the outer surface 59 of the pipe 38 is received in the cavity 18; and the second O-ring 34 can form a seal upon compression against the stop 60 by the insertion of the pipe end 38a in the cavity 18. Advantageously, the dual O-ring configuration of the pipe socket 10 and threaded pipe connection 100 has the function of providing a primary seal (e.g., by virtue of the O-rings 30, 34 and the threads 50a, 58) and providing an initial guide to insertion of the pipe end 38a in the cavity 18.

According to some implementations of the pipe socket 10 and threaded pipe connection 100 depicted in FIGS. 1-1C, a single O-ring may be employed in the pipe socket 10, e.g., first and/or second O-rings 30, 34. Further, more than two O-rings can be employed in some implementations of the pipe socket 10 (not shown), as necessary for additional sealing or other engineering considerations, as understood by those with ordinary skill in the field of the disclosure. Moreover, in some implementations of the pipe socket 10, leak detection O-rings (not shown) can be added to the pipe socket 10 or may be configured to replace the first and/or second O-rings 30, 34. It should also be understood that the positions shown in FIGS. 1-1C for the first and second O-rings 30, 34 are exemplary; accordingly, the pipe socket 10 can be configured such that the first and/or second O-rings 30, 34 are placed at various locations along the cavity 18, with modifications to the socket body 14 made to accommodate these alternative positions (e.g., movement of the recess 32 to a different location to accommodate a different position for the first O-ring 30, adjustment of the geometry of the stop 60 to accommodate a different position for the second O-ring 34, etc.).

Referring again to FIGS. 1-1C, the pipe socket 10, and its socket body 14, can be configured or otherwise modified by those with ordinary skill in the field of the disclosure as necessary, to aid in the joining of: (a) the socket 10 to a pipe 38 (i.e., as a threaded pipe connection 100); (b) the socket to two pipes 38 (e.g., the pipe socket 10 being configured as a coupling for the pipes 38, not shown); (c) a pipe 38 to a valve assembly (e.g., the socket body 14 of the socket 10 being configured as a valve body of the valve assembly, not shown); and (d) a cap to a pipe 38 (e.g., the socket body 14 of the socket 10 being configured as the cap, not shown). In each of these configurations, the pipe socket 10 and/or socket body 14 (e.g., as a cap, valve body, coupling, etc.) and pipe(s) 38 may carry fluid media (e.g., a liquid and/or a gas). According to some embodiments of the pipe socket 10, the socket body 14 may be configured as an outer nut drive face which may facilitate the insertion of the pipe 38 into the socket 10 as well as the threading of the pipe 38. In some of these embodiments, the socket body 14 can further define a plurality of outer faces 11 (see FIG. 1) that are configured to receive a rotatable end of a torquing tool (e.g., a fixed wrench, a socket, adjustable crescent wrench, etc.)

According to some implementations, the pipe socket 10 can be configured to mate with pipe(s) 38 fabricated from ferrous alloys (e.g., such as black iron, carbon steel and stainless steel), copper-based alloys (e.g., such as copper, bronze and brass), nickel-based alloys (e.g., such as Inconel® and Nimonic® alloys) and/or combined metals and non-metals (e.g., such as metal components and plastic piping, such as polyvinyl chloride piping). According to embodiments, the socket body 14 of the pipe socket 10 can likewise be fabricated from any such ferrous alloys, copper-based alloys, nickel-based alloys and/or plastic materials.

Figure 2:
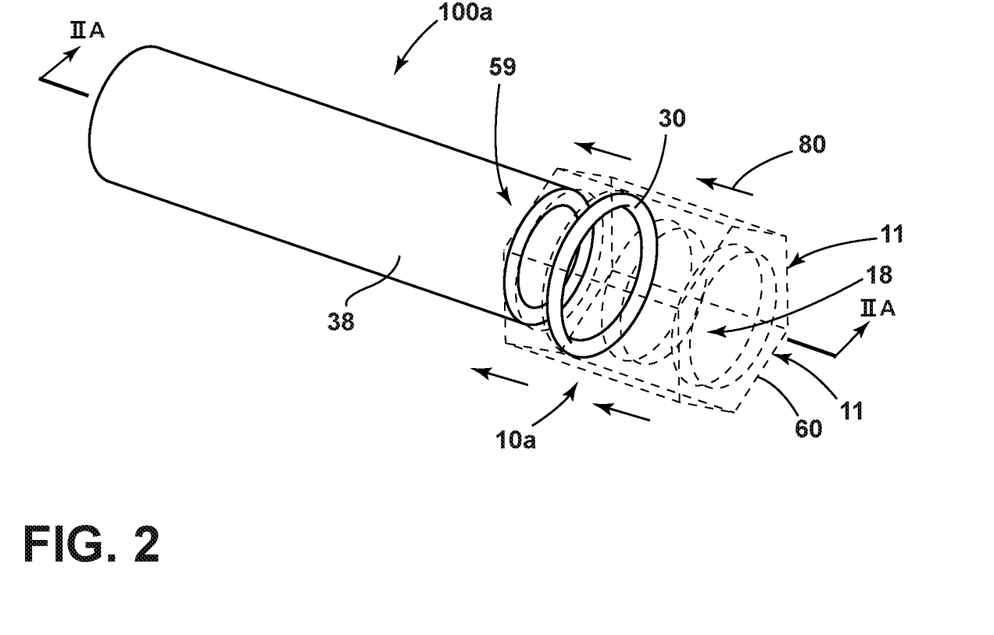
FIG. 2 is a perspective, cut-away view of a pipe socket with a single O-ring and a pipe for making a threaded pipe connection in situ, according to an embodiment.
Figure 2A:
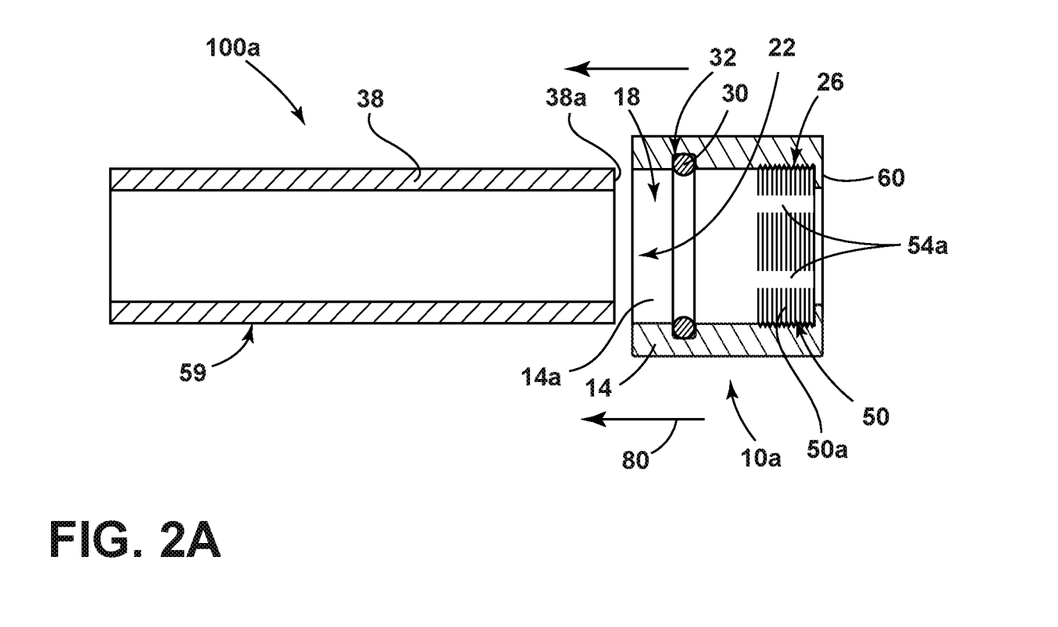
FIG. 2A is a cross-sectional view of the pipe socket and pipe depicted in FIG. 2 along line IIA-IIA.
Figure 2B:
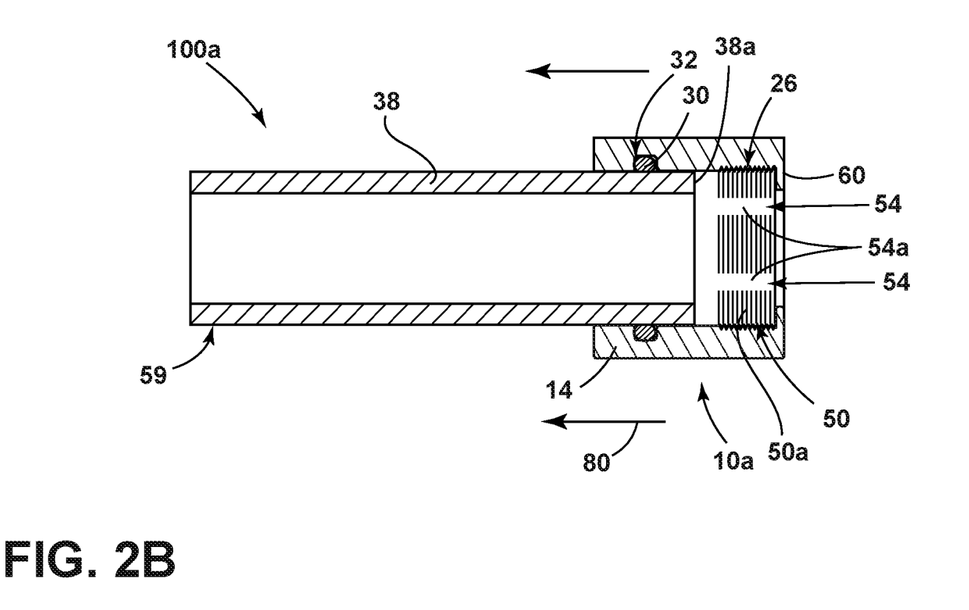
FIG. 2B is a cross-sectional view of the pipe socket and pipe depicted in FIG. 2, as the pipe is received in a cavity of the socket.
Figure 2C:
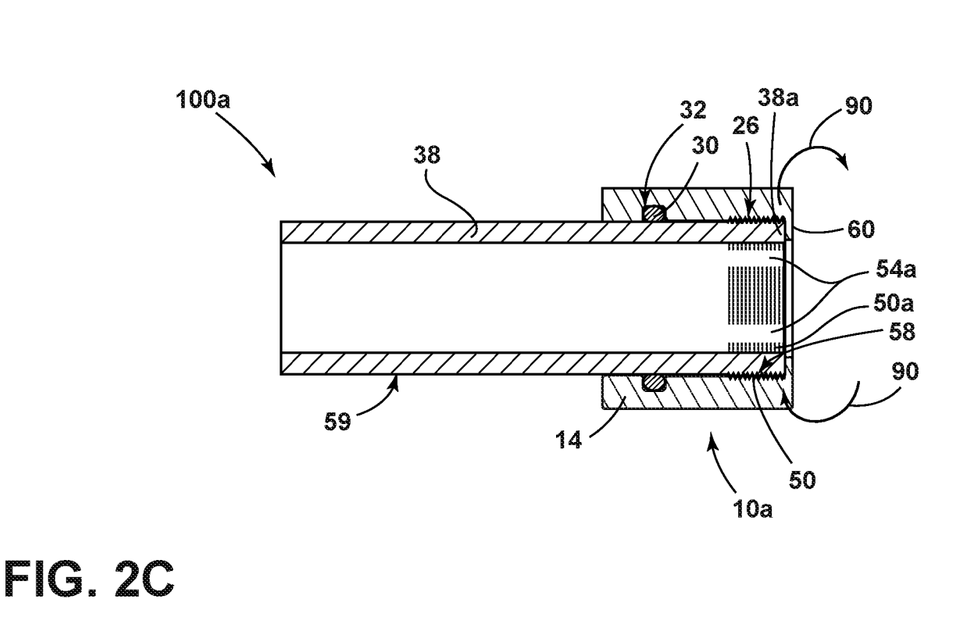
FIG. 2C is a cross-sectional view of a threaded pipe connection formed in situ by the pipe socket and pipe depicted in FIG. 2, according to an embodiment.

Referring now to FIGS. 2-2C, reference numerals 10*a* and 100*a* are generally directed to a pipe socket and a threaded pipe connection, respectively. As is evident from the figures, pipe socket 10*a* and threaded pipe connection 100*a* are substantially similar to the pipe socket 10 and threaded pipe connection 100 depicted in FIGS. 1-1C, and like-numbered elements have the same structure and functions, as noted earlier. The primary difference between these pipe sockets and threaded connections is that the pipe socket 10*a* and threaded pipe connection 100*a* are configured with a first O-ring 30 and recess 32, and no second O-ring. In this configuration of the pipe socket 10*a* and threaded pipe connection 100*a*, the first O-ring 30 is placed near a lead-in to the pipe socket 10*a*, outboard of the threaded portion 26 of the cavity 18. That is, the first O-ring 30 is positioned in a recess 32 within the internal surface 14*a* of the socket body 14 proximate to the threaded portion 26 (e.g., near the opening 22 opposite from the threaded portion 26) such that an outer surface 59 of the pipe 38 received within the cavity 18 compresses the O-ring 30 upon insertion of the pipe 38 into the cavity 18. This O-ring position allows the outer surface 59 of the pipe 38 that has not entered into the threaded portion 26 of the socket 10*a* to come in contact with the O-ring. The O-ring 30 can seal against the pipe 38 in a like manner as for a push-and-press seal, commonly employed in the field of disclosure. Advantageously, costs of the pipe socket 10*a* and threaded pipe connection 100*a* can be minimized as the configuration employs a single O-ring (e.g., O-ring 30) and installation is relatively simple insofar as a seal between the pipe 38 and the socket 10*a* develops upon insertion of the pipe end 38*a* in the cavity 18 past the first O-ring 30 and pipe threads 58 (see FIG. 2C) are formed in the pipe 38.

Figure 3:
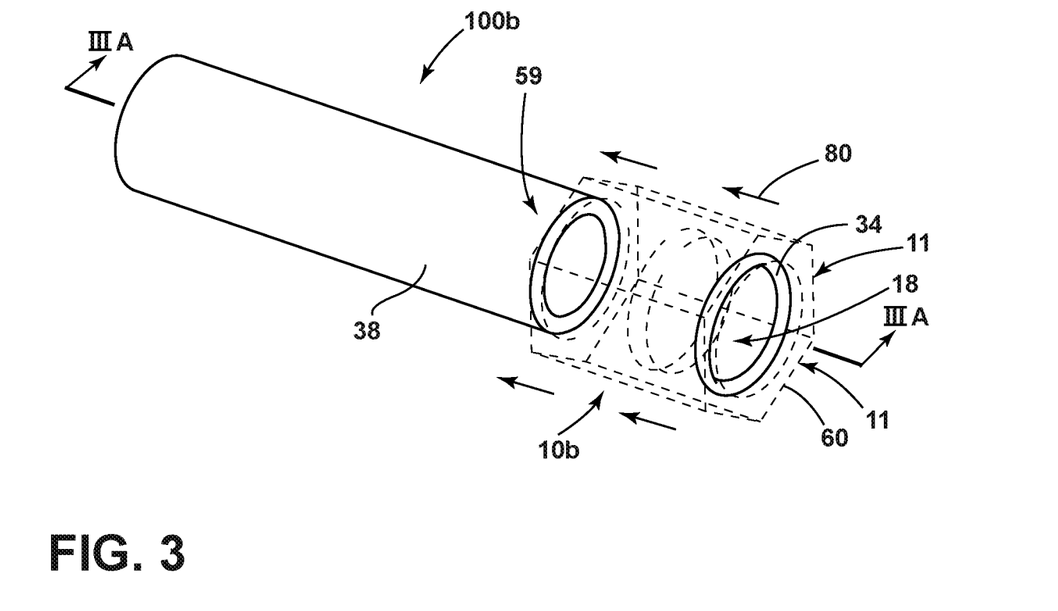
FIG. 3 is a perspective, cut-away view of a pipe socket with a single O-ring and a pipe for making a threaded pipe connection in situ, according to an embodiment.
Figure 3A:
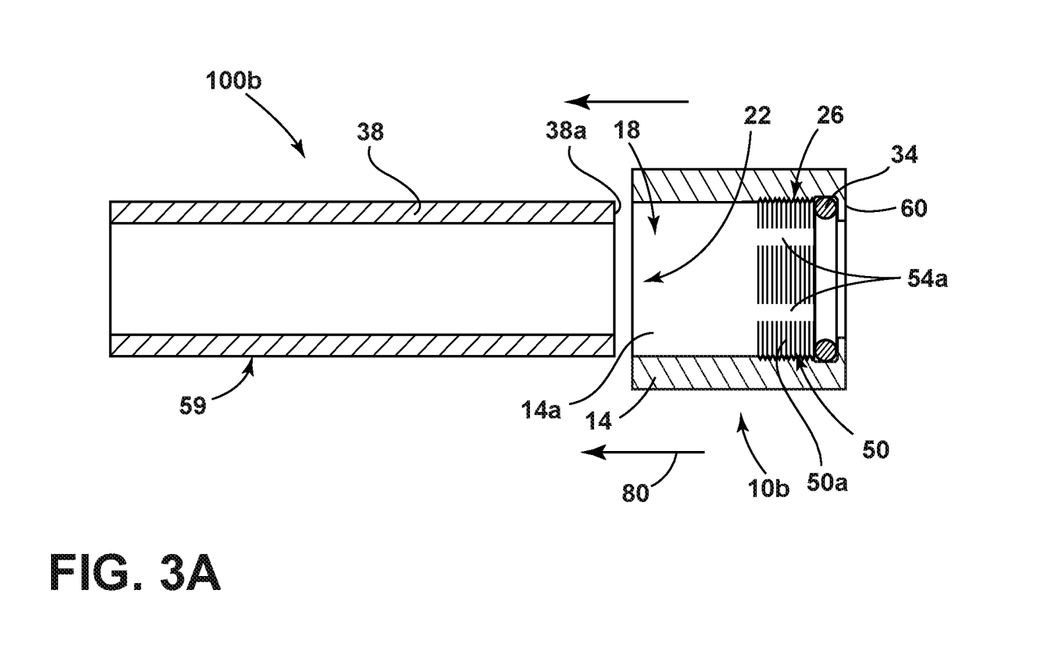
FIG. 3A is a cross-sectional view of the pipe socket and pipe depicted in FIG. 3 along line IIIA-IIIA.
Figure 3B:
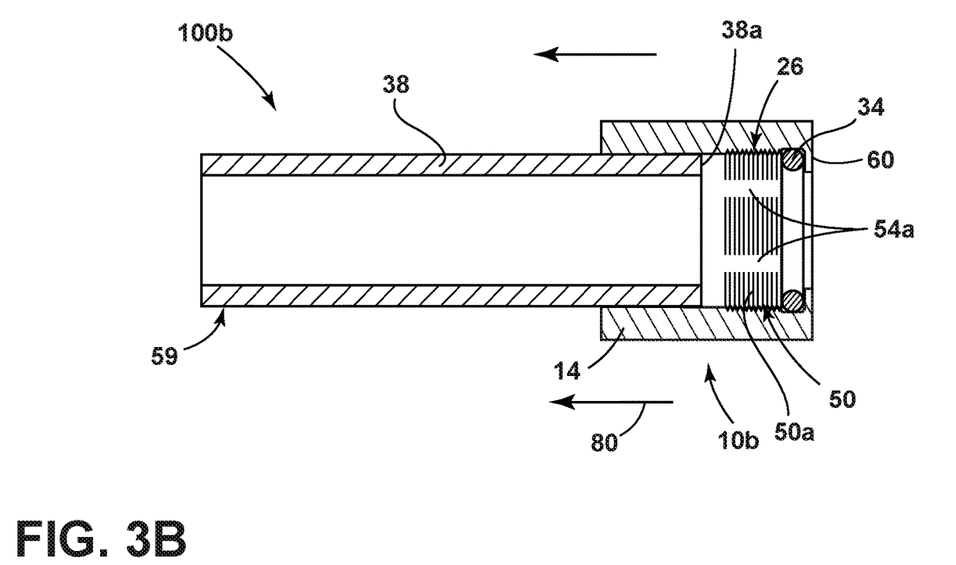
FIG. 3B is a cross-sectional view of the pipe socket and pipe depicted in FIG. 3, as the pipe is received in a cavity of the socket.
Figure 3C:
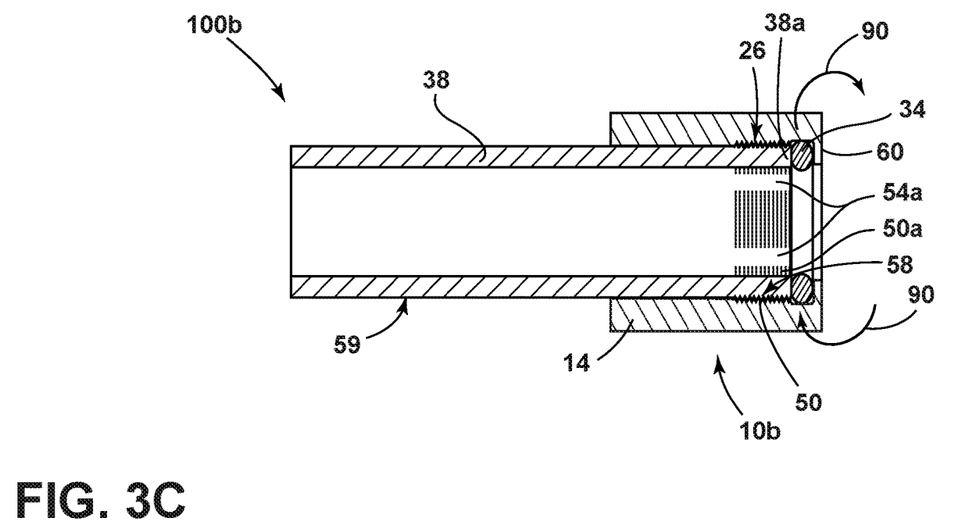
FIG. 3C is a cross-sectional view of a threaded pipe connection formed in situ by the pipe socket and pipe depicted in FIG. 3, according to an embodiment.

Referring now to FIGS. 3-3C, reference numerals 10*b* and 100*b* are generally directed to a pipe socket and a threaded pipe connection, respectively. As is evident from the figures, pipe socket 10*b* and threaded pipe connection 100*b* are substantially similar to the pipe socket 10 and threaded pipe connection 100 depicted in FIGS. 1-1C, and like-numbered elements have the same structure and functions, as noted earlier. The primary difference between these pipe sockets and threaded connections is that the pipe socket 10*b* and threaded pipe connection 100*b* are configured with a second O-ring 34, and no other O-ring or recess for an O-ring. More particularly, the second O-ring 34 is positioned adjacent to the stop 60 such that an end 38*a* of the pipe 38 received within the cavity 18 compresses the O-ring 34 against the stop 60. With further regard to the pipe socket 10*b* and the threaded pipe connection 100*b*, the positioning of the O-ring 34 in the pipe socket 10*b* and threaded pipe connection 100*b* allows the end 38*a* to the pipe 38 to be tightened up against the second O-ring 34, compressing the O-ring 34 between the end 38*a* of the pipe 38 and the stop 60. In some embodiments, the O-ring 34 is compressed against the stop 60 and partially displaced along the outer surface 59 of the pipe end 38*a* in proximity to the stop 60. Advantageously, the seal developed between by the pipe socket 10*b* and connection 100*b* has excellent reliability as the threads 50*a*, 58 and the O-ring 34 between the stop 60 and the pipe end 38*a* collectively form a tight seal. Also advantageously, costs of the pipe socket 10*b* and threaded pipe connection 100*b* can be minimized as the configuration employs a single O-ring (e.g., O-ring 34) with no need for a recess in the socket body 14 or the like to position the O-ring prior to installation.

Referring now to FIGS. 4-4C, reference numerals 10*c* and 100*c* are generally directed to a pipe socket and a threaded pipe connection, respectively. As is evident from the figures, pipe socket 10*c* and threaded pipe connection 100*c* are substantially similar to the pipe socket 10 and threaded pipe connection 100 depicted in FIGS. 1-1C, and like-numbered elements have the same structure and functions, as noted earlier. The primary difference between these pipe sockets and threaded connections is that the pipe socket 10*c* and threaded pipe connection 100*c* are configured with a stop 60*c* having a tapered profile. In particular, the stop 60*c* can be tapered or otherwise angled such that an end 38*a* of the pipe 38 received within the cavity 18 compresses the O-ring 34 against the stop 60*c* and also displaces a portion of the O-ring 34 such that it is in contact with an outer surface 59 of the pipe 38. This position of the O-ring 34 (e.g., in proximity to the stop 60*c*) and the design of the O-ring contact surfaces (i.e., the stop 60*c*) are intended to allow for a soft stop of the pipe end 38*a* against the stop 60*c*. Advantageously, this configuration of the pipe socket 10*c* and threaded pipe connection 100*c* provides an allowance for final adjustments to be made in order to properly orient the socket body 14 in relationship to line position of the pipe end 38*a*. For example, a pipe socket 10*c* configured as a valve could be aligned and adjusted so as to allow for better access to its valve handle.

Referring again to the pipe sockets 10-10*c* and threaded pipe connections 100-100*c* depicted in FIGS. 1-4C, an exemplary method of utilizing these sockets on a pipe 38 begins with a step of the inserting the pipe end 38*a* securely into the socket (e.g., sockets 10-10*c*) or fitting the socket over the pipe end 38*a* with a force 80 (see FIGS. 1-1B, 2-2B, 3-3B and 4-4B). Next, the socket 10-10*c* can be engaged along the outer drive nut surface (e.g., plurality of faces 11) manually, with a standard wrench or other torquing tool, or a power-assisted torquing tool. Next, the socket 10-10*c* is rotated with a force 90 equivalent to a manual threading operation (e.g., hand-tightening of a nut), mechanical threading operation (e.g., with a standard wrench, socket, etc.) or a power-assisted threading operation (e.g., a power-assisted socket). Next, each of the plurality of the interrupted series 50 of tapping threads 50*a* engages the pipe end 38*a* and advance insertion of the pipe 38 due to the geometry of the tapping threads 50*a* (e.g., with a conventional pitch). Next, the advancement of the pipe end 38*a* relative to the pipe socket body 14 causes a progressive deepening of threading grooves in the pipe 38, thus forming pipe threads 58, along with possible deformation of the tapping threads 50*a* (see FIGS. 1C, 2C, 3C and 4C). Next, the rotating pipe socket 10-10*c* continues to advance over the pipe end 38*a*, eventually compressing a sealing O-ring (e.g., the first and/or second O-rings 30, 34) between an inner face of the socket 10 (e.g., stop 60, recess 32), and an outer surface 59 of the pipe 38 and/or the pipe end 38*a* (see FIGS. 1C, 2C, 3C and 4C). Next, the socket 10-10*c* continues to advance until the end 38*a* of the pipe 38 hits the stop 60 or compresses an O-ring positioned between it and the stop 60. During the interfacing between the threads 50*a* and the outer surface 59 of the pipe 38, material removed from the pipe 38 to form the pipe threads 58 may be ejected or otherwise accumulate within the openings 54*a*, spaced between the plurality of interrupted series 50 of tapping threads 50*a*. In other words, the threaded portion 26 may include axial openings 22 configured to eject material from threads formed on the pipe 38 received within the cavity by the interrupted series of tapping threads. Advantageously, the removal of such material during the method facilitates the in situ creation of the threaded pipe connection 100-100c with limited required rotational forces 90 consequently, in some embodiments, hand-tightening is sufficient to form such pipe connections.

More generally, use of the present disclosure may provide a variety of advantages to the installer, consumer, engineer or the like tasked with installing or employing pipe sockets 10-10c and threaded pipe connections 100-100c (see FIGS. 1-4C). The pipe and plumbing joinery configurations and methods of the disclosure provide a suitable substitute for thermal- and threading-related joinery configurations and techniques. In general, the joinery of the disclosure improves safety by eliminating heat and simplifies installation by removing the element of art (e.g., with regard to brazing and soldering approaches). Further, the joinery of the disclosure reduces the time required for installation as compared to both threading-related and thermal-related joinery approaches and configuration. The joinery of the disclosure improves upon mechanical, threading-related joinery through the following advantages. First, the joinery of the disclosure allows for the elimination of specialized equipment and tooling required to make press connections while in the field. Second, an increased mechanical strength of the joint is afforded by the engagement between the plurality of interrupted series 50 of tapping threads 50a of the socket 10-10c and the pipe threads 58 formed in the pipe 38. Third, the joinery of the disclosure provides an improvement in flexibility and reduction in the installation cost, as the joinery can be employed with largely un-prepped piping by a relatively unskilled technician (e.g., a homeowner) using only a basic pipe wrench or other simple torquing tool.

Examples

The following example represents certain non-limiting embodiments of the disclosure.

Figure 5:
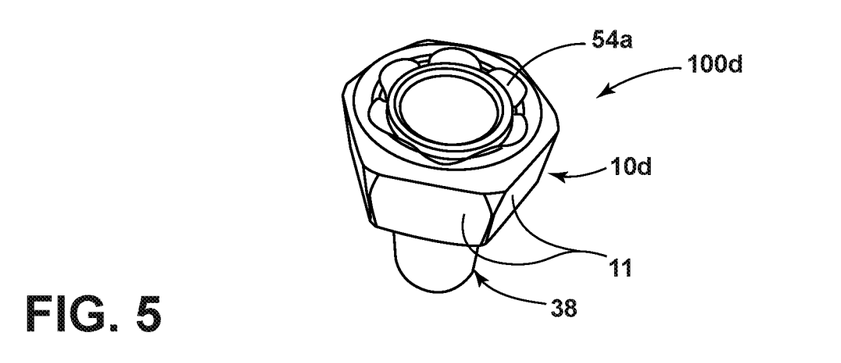
FIG. 5 is a perspective view of a threaded pipe connection formed in situ, according to an embodiment.
Figure 5A:
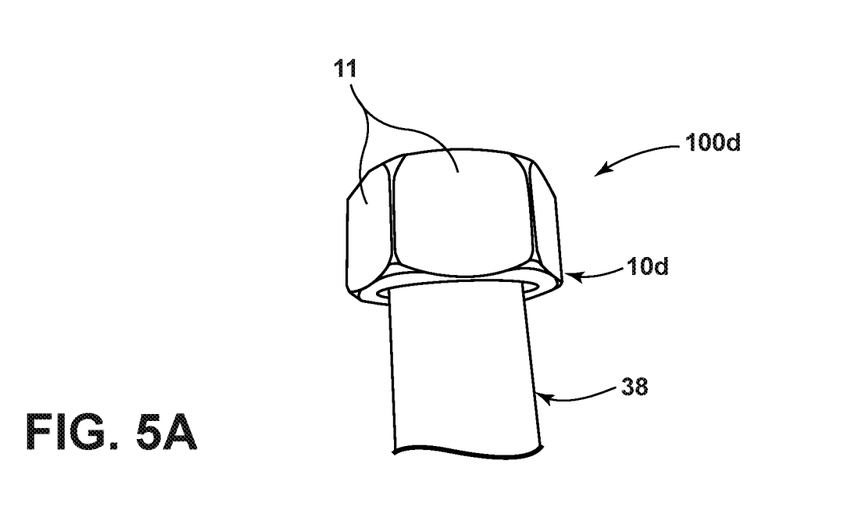
FIG. 5A is a side view of the threaded pipe connection shown in FIG. 5.
Figure 5B:
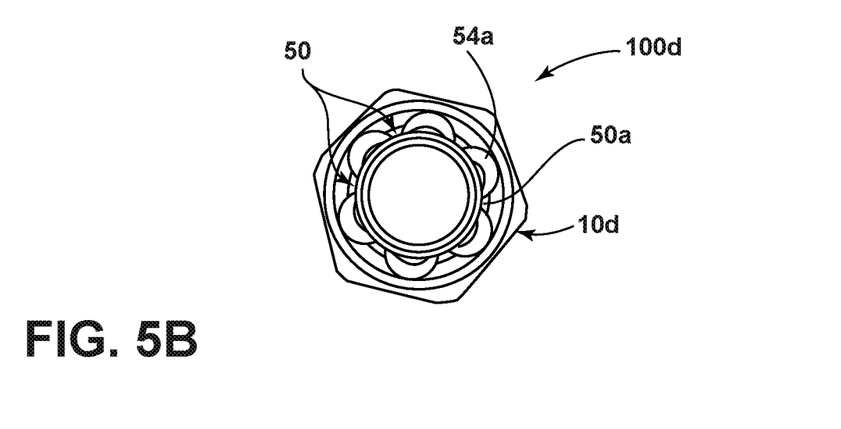
FIG. 5B is an end-on view of the threaded pipe connection shown in FIG. 5.

Referring now to FIGS. 5-5B, the basic concept of an in situ threaded pipe connection 100d (e.g., as comparable to thread pipe connections 100-100c, unless otherwise noted) was demonstrated in a simple way by joining together a machine-modified nut (e.g., the socket 10d) to a section of black iron pipe (e.g., the pipe 38). In this demonstration, multiple sets of tapping threads (e.g., a plurality of interrupted series 50 of tapping threads 50a) were created within a standard 1" hex nut. In particular, internal threads within the nut were removed (e.g., drilled away) at six equidistant locations around the thread bore (e.g., to form the openings 54a and the plurality of interrupted series 50 of tapping threads 50a). The areas of thread interruption (i.e., at the openings 54a) were located central to thread flats (e.g., faces 11). In addition, the lead threads 50a of the nut were tapered to provide a lead-in for first pipe engagement during the creation of the threaded pipe connection 100d.

After creation of the nut with multiple sets of tapping threads, a section of black iron pipe (e.g., pipe 38) was deburred and then clamped into a vise. The as-modified nut (i.e., the pipe socket 10d) was then positioned atop the end of the pipe with only slight hand pressure to keep the nut oriented on the pipe. A modestly sized crescent wrench was then used to tighten the nut onto the pipe. The nut progressed onto the pipe as the nut was turned with only modest torque being applied. The nut was advanced until the nut was fully inserted onto the end of the pipe, thus forming an in situ threaded pipe connection 100d.

According to a first aspect, the pipe socket for making a threaded pipe connection comprises a socket body, an O-ring positioned within the cavity, and a plurality of interrupted series of tapping threads defined on an internal surface of the socket body in the threaded portion. The socket body defines a threaded portion, a cavity and a stop. The cavity is configured to receive a pipe and the stop is configured to stop the pipe received within the cavity. Each of the interrupted series of tapping threads is circumferentially spaced equidistant from each of the adjacent interrupted series of tapping threads, and each of the interrupted series of tapping threads comprises threads arranged axially on the internal surface of the socket body for forming pipe threads on the pipe received within the cavity.

According to a second aspect, the pipe socket of first aspect is provided, wherein the threaded portion further comprises axial openings arranged between each of the interrupted series of threads, the openings configured to eject material from pipe threads formed on the pipe received within the cavity by the interrupted series of tapping threads.

According to a third aspect, the pipe socket of first or second aspect is provided, wherein the O-ring is positioned adjacent to the stop such that an end of the pipe received within the cavity compresses the O-ring against the stop.

According to a fourth aspect, the pipe socket of the first or second aspect is provided, wherein the stop is tapered such that the end of the pipe received within the cavity compresses the O-ring against the stop and displaces a portion of the O-ring in contact with an outer surface of the pipe.

According to a fifth aspect, the pipe socket of the first aspect or the second aspect is provided, wherein the O-ring is positioned in a recess within the internal surface of the socket body proximate to the threaded portion such that an outer surface of the pipe received within the cavity compresses the O-ring upon insertion of the pipe into the cavity.

According to a sixth aspect, the pipe socket of the first, second, third, fourth, or fifth aspect is provided, wherein the socket body further defines a plurality of outer faces configured to receive a rotatable end of a torquing tool.

According to a seventh aspect, the pipe socket of the first, second, third, fourth, fifth, or sixth aspect is provided, wherein the socket body is configured as a valve body for a valve assembly in contact with the pipe received within the cavity.

According to an eight aspect, the pipe socket of the first, second, third, fourth, fifth, sixth, or seventh aspect is provided, wherein the socket body is configured as a cap for the pipe received within the cavity.

According to a ninth aspect, a pipe socket for making a threaded pipe connection comprises a socket body, a plurality of O-rings positioned within the cavity, and a plurality of interrupted series of tapping threads defined on an internal surface of the socket body in the threaded portion. The pipe socket body defines a threaded portion, a cavity and a stop. The cavity is configured to receive a pipe, and the stop is configured to stop the pipe received within the cavity. Each of the interrupted series of tapping threads is circumferentially equidistant from each of the adjacent interrupted series of tapping threads, and each of the interrupted series of tapping threads comprises threads arranged axially on the internal surface of the socket body for forming pipe threads on the pipe received within the cavity.

According to a tenth aspect, the pipe socket of the ninth aspect is provided, wherein the threaded portion further comprises axial openings arranged between each of the interrupted series of threads, the openings configured to eject material from pipe threads formed on the pipe received within the cavity by the interrupted series of tapping threads.

According to an eleventh aspect, the pipe socket of the ninth or tenth aspect is provided, wherein the plurality of O-rings is a first O-ring and a second O-ring, wherein the first O-ring is positioned adjacent to the stop such that an end of the pipe received within the cavity compresses the first O-ring against the stop, and the second O-ring is positioned in a recess within the internal surface of the socket body proximate to the threaded portion such that an outer surface of the pipe received within the cavity compresses the second O-ring upon insertion of the pipe into the cavity.

According to a twelfth aspect, the pipe socket of the ninth, tenth, or eleventh aspect is provided, wherein the socket body further defines a plurality of outer faces configured to receive a rotatable end of a torquing tool.

According to a thirteenth aspect, the pipe socket of the ninth, tenth, eleventh, or twelfth aspect is provided, wherein the socket body is configured as a valve body for a valve assembly in contact with the pipe received within the cavity.

According to a fourteenth aspect, the pipe socket of the ninth, tenth, eleventh, or twelfth aspect is provided, wherein the socket body is configured as a cap for the pipe received within the cavity.

According to a fifteenth aspect, a threaded pipe connection comprises a socket body, an O-ring positioned within the cavity, a plurality of interrupted series of tapping threads defined on an internal surface of the socket body in the threaded portion, and a pipe received within the cavity that comprises an end in contact with or proximate to the stop. The socket body defines a threaded portion, a cavity and a stop. Each of the interrupted series of tapping threads is circumferentially equidistant from each of the adjacent interrupted series of tapping threads. Each of the interrupted series of tapping threads comprises threads arranged axially on the internal surface of the socket body for forming pipe threads on the pipe received within the cavity.

According to a sixteenth aspect, the pipe connection of the fifteenth aspect is provided, wherein the threaded portion further comprises axial openings arranged between each of the interrupted series of threads, the openings configured to eject material from pipe threads formed on the pipe received within the cavity by the interrupted series of tapping threads.

According to a seventeenth aspect, the pipe connection of the fifteenth or sixteenth aspect is provided, wherein the O-ring is positioned adjacent to the stop such that the end of the pipe received within the cavity compresses the O-ring against the stop.

According to an eighteenth aspect, the pipe connection of the fifteenth aspect or sixteenth aspect is provided, wherein the stop is tapered such that the end of the pipe received within the cavity compresses the O-ring against the stop and displaces a portion of the O-ring in contact with an outer surface of the pipe.

According to a nineteenth aspect, the pipe connection of the fifteenth aspect or sixteenth aspect is provided, wherein the O-ring is positioned in a recess within the internal surface of the socket body proximate to the threaded portion such that an outer surface of the pipe received within the cavity compresses the O-ring upon insertion of the pipe into the cavity.

According to a twentieth aspect, the pipe connection of the fifteenth, sixteenth, seventeenth, eighteenth, or nineteenth aspect is provided, wherein the socket body further defines a plurality of outer faces configured to receive a rotatable end of a torquing tool.

It will be apparent to those skilled in the art that various modifications and variations can be made to the present disclosure without departing from the spirit and scope of the disclosure. Thus, it is intended that the present disclosure cover such modifications and variations provided they come within the scope of the appended claims and their equivalents.

What is claimed is:

1. A pipe socket for making a threaded pipe connection, comprising:
   a socket body defining a threaded portion, a cavity and a stop;
   an O-ring positioned within the cavity; and
   a plurality of interrupted series of tapping threads defined on an internal surface of the socket body in the threaded portion,
   wherein the cavity is configured to receive a pipe and the stop is configured to stop the pipe received within the cavity,
   wherein each of the interrupted series of tapping threads is circumferentially spaced equidistant from each of the adjacent interrupted series of tapping threads,
   wherein each of the interrupted series of tapping threads comprises threads arranged axially on the internal surface of the socket body for forming pipe threads on the pipe received within the cavity, and
   further wherein the socket body is configured as a valve body for a valve assembly in contact with the pipe received within the cavity.

2. The pipe socket of claim 1, wherein the threaded portion further comprises axial openings arranged between each of the interrupted series of threads, the openings configured to eject material from pipe threads formed on the pipe received within the cavity by the interrupted series of tapping threads.

3. The pipe socket of claim 1, wherein the socket body further defines a plurality of outer faces configured to receive a rotatable end of a torquing tool.

4. A pipe socket for making a threaded pipe connection, comprising:
   a socket body defining a threaded portion, a cavity and a stop;
   a plurality of O-rings positioned within the cavity; and
   a plurality of interrupted series of tapping threads defined on an internal surface of the socket body in the threaded portion,
   wherein the cavity is configured to receive a pipe and the stop is configured to stop the pipe received within the cavity,
   wherein each of the interrupted series of tapping threads is circumferentially equidistant from each of the adjacent interrupted series of tapping threads,
   wherein each of the interrupted series of tapping threads comprises threads arranged axially on the internal surface of the socket body for forming pipe threads on the pipe received within the cavity, and
   further wherein the socket body is configured as a valve body for a valve assembly in contact with the pipe received within the cavity.

5. The pipe socket of claim 4, wherein the threaded portion further comprises axial openings arranged between each of the interrupted series of threads, the openings configured to eject material from pipe threads formed on the pipe received within the cavity by the interrupted series of tapping threads.

6. The pipe socket of claim 4, wherein the plurality of O-rings is a first O-ring and a second O-ring, wherein the first O-ring is positioned adjacent to the stop such that an end of the pipe received within the cavity compresses the first O-ring against the stop, and the second O-ring is positioned in a recess within the internal surface of the socket body proximate to the threaded portion such that an outer surface of the pipe received within the cavity compresses the second O-ring upon insertion of the pipe into the cavity.

7. The pipe socket of claim 4, wherein the socket body further defines a plurality of outer faces configured to receive a rotatable end of a torquing tool.

8. A threaded pipe connection, comprising:
a socket body defining a threaded portion, a cavity and a stop;
an O-ring positioned within the cavity;
a plurality of interrupted series of tapping threads defined on an internal surface of the socket body in the threaded portion; and
a pipe received within the cavity that comprises an end in contact with or proximate to the stop,
wherein each of the interrupted series of tapping threads is circumferentially equidistant from each of the adjacent interrupted series of tapping threads,
wherein each of the interrupted series of tapping threads comprises threads arranged axially on the internal surface of the socket body for forming pipe threads on the pipe received within the cavity, and
further wherein the socket body is configured as a valve body for a valve assembly in contact with the pipe received within the cavity.

9. The pipe connection of claim 8, wherein the threaded portion further comprises axial openings arranged between each of the interrupted series of threads, the openings configured to eject material from pipe threads formed on the pipe received within the cavity by the interrupted series of tapping threads.

10. The pipe connection of claim 8, wherein the O-ring is positioned adjacent to the stop such that the end of the pipe received within the cavity compresses the O-ring against the stop.

11. The pipe connection of claim 10, wherein the stop is tapered such that the end of the pipe received within the cavity compresses the O-ring against the stop and displaces a portion of the O-ring in contact with an outer surface of the pipe.

12. The pipe connection of claim 8, wherein the O-ring is positioned in a recess within the internal surface of the socket body proximate to the threaded portion such that an outer surface of the pipe received within the cavity compresses the O-ring upon insertion of the pipe into the cavity.

13. The pipe connection of claim 8, wherein the socket body further defines a plurality of outer faces configured to receive a rotatable end of a torquing tool.

14. A pipe socket for making a threaded pipe connection, comprising:

a socket body defining a threaded portion, a cavity and a stop;
an O-ring positioned within the cavity; and
a plurality of interrupted series of tapping threads defined on an internal surface of the socket body in the threaded portion,
wherein the cavity is configured to receive a pipe and the stop is configured to stop the pipe received within the cavity,
wherein each of the interrupted series of tapping threads is circumferentially spaced equidistant from each of the adjacent interrupted series of tapping threads,
wherein each of the interrupted series of tapping threads comprises threads arranged axially on the internal surface of the socket body for forming pipe threads on the pipe received within the cavity,
wherein the O-ring is positioned adjacent to the stop such that an end of the pipe received within the cavity compresses the O-ring against the stop, and
further wherein the stop is tapered such that the end of the pipe received within the cavity compresses the O-ring against the stop and displaces a portion of the O-ring in contact with an outer surface of the pipe.

15. The pipe socket of claim 14, wherein the socket body is configured as a cap for the pipe received within the cavity.

16. A pipe socket for making a threaded pipe connection, comprising:
a socket body defining a threaded portion, a cavity and a stop;
an O-ring positioned within the cavity; and
a plurality of interrupted series of tapping threads defined on an internal surface of the socket body in the threaded portion,
wherein the cavity is configured to receive a pipe and the stop is configured to stop the pipe received within the cavity,
wherein each of the interrupted series of tapping threads is circumferentially spaced equidistant from each of the adjacent interrupted series of tapping threads,
wherein each of the interrupted series of tapping threads comprises threads arranged axially on the internal surface of the socket body for forming pipe threads on the pipe received within the cavity, and
further wherein the O-ring is positioned in a recess within the internal surface of the socket body proximate to the threaded portion such that an outer surface of the pipe received within the cavity compresses the O-ring upon insertion of the pipe into the cavity.

* * * * *